United States Patent
Shakory-Tabrizi

(10) Patent No.: US 7,264,388 B2
(45) Date of Patent: Sep. 4, 2007

(54) MOTOR VEHICLE HAVING AN ILLUMINATING DEVICE RECEIVING SYSTEM FOR AN EXTERIOR ILLUMINATING DEVICE

(75) Inventor: Reza Shakory-Tabrizi, Markgroeningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 129 days.

(21) Appl. No.: 11/125,145

(22) Filed: May 10, 2005

(65) Prior Publication Data

US 2005/0254252 A1 Nov. 17, 2005

(30) Foreign Application Priority Data

May 11, 2004 (DE) .................... 10 2004 023 090

(51) Int. Cl.
*B60Q 1/04* (2006.01)
(52) U.S. Cl. .................... 362/549; 362/507; 362/546
(58) Field of Classification Search ................ 362/500, 362/546, 549, 507, 506
See application file for complete search history.

(56) References Cited

U.S. PATENT DOCUMENTS

| 4,786,093 A | 11/1988 | Nishii |  |
|---|---|---|---|
| 5,154,505 A * | 10/1992 | Sasamoto | 362/549 |
| 7,029,154 B2 * | 4/2006 | Arlon et al. | 362/507 |

FOREIGN PATENT DOCUMENTS

| DE | 43 11 419 A1 | 10/1994 |  |
|---|---|---|---|
| DE | 43 11 419 C2 | 10/1994 |  |
| DE | 198 18 791 A1 | 10/1999 |  |
| EP | 0 422 405 | * | 9/1990 |
| EP | 1 293 379 A1 | 3/2003 |  |
| EP | 1 481 878 A1 | 12/2004 |  |
| JP | 3-208738 A | 9/1991 |  |
| WO | WO 03/043854 A1 | 5/2003 |  |
| WO | WO 03/074347 A1 | 9/2003 |  |

OTHER PUBLICATIONS

European Search Report dated Sep. 14, 2006 with an English translation of the pertinent portion (four (4) pages).
German Office Action dated May 4, 2006 with English translation of pertinent portion (Eleven (11) pages).

* cited by examiner

*Primary Examiner*—Alan Cariaso
*Assistant Examiner*—Leah S. Lovell
(74) *Attorney, Agent, or Firm*—Crowell & Moring LLP

(57) ABSTRACT

A motor vehicle with a vehicle body has a vehicle body skin, an exterior illuminating device which is inserted into a slide-in opening in the vehicle body skin, and an illuminating device receiving system which is fastened adjacent to the slide-in opening on the interior side of the vehicle body skin. The illuminating device receiving system has at least one approximately horizontally oriented receiving plate and first and second fastening flanges which are connected with first and second fastening surfaces constructed on the interior side of the vehicle body skin. To optimize the gap measurement between the exterior illuminating devices and the slide-in opening, the fastening flanges and the fastening surfaces are situated in a plane with respect to which a vertical vehicle axis is parallel.

8 Claims, 3 Drawing Sheets

MOTOR VEHICLE HAVING AN ILLUMINATING DEVICE RECEIVING SYSTEM FOR AN EXTERIOR ILLUMINATING DEVICE

This application claims the priority of German application 10 2004 023 090.0, filed May 11, 2004, the disclosure of which is expressly incorporated by reference herein.

BACKGROUND AND SUMMARY OF THE INVENTION

This invention relates to a motor vehicle with a vehicle body having a vehicle body skin with a slide-in opening into which an exterior illuminating device is inserted, and an illuminating device receiving system which is fastened adjacent to the slide-in opening on an interior side of the vehicle body skin. The illuminating device receiving system has at least one approximately horizontally oriented receiving plate and at least first and second fastening flanges which are connected with first and second fastening surfaces on the interior side of the vehicle body skin.

German Patent Document DE 43 11 419 C2 discloses a motor vehicle of the above-mentioned type which has a vehicle body with a vehicle body skin. The vehicle body skin has a slide-in opening into which an exterior illuminating device, particularly a headlight, is inserted. An illuminating device receiving system is used for fastening the exterior illuminating device and is fastened, adjacent to the slide-in opening, to the interior side of the vehicle body skin. FIG. 2 of German Patent Document DE 43 11 419 C2 is a cross-sectional view of the illuminating device receiving system. It has an approximately horizontally oriented receiving plate which is constructed with a U-shaped cross-section. Fastening flanges projecting to the outside are formed at the ends of the legs of the U-shaped illuminating device receiving system. One of these fastening flanges extends upright and, thus, approximately parallel to the vertical vehicle axis. Another of the fastening flanges extends transversely and, thus, approximately horizontally thereto. The fastening flanges are furthermore shown in FIG. 7 of German Patent Document DE 43 11 419 C2, and that document also mentions a third fastening flange which extends in a curved manner as a strip and is adapted to the edge of the slide-in opening. In order to be able to adjust the gap measurements of the headlights with respect to the edge of the slide-in opening when the headlight is inserted, the headlight can be displaced within the illuminating device receiving system by way of an adjusting device.

German Patent Document DE 198 18 791 A1 concerns a motor vehicle which has a headlight fastening system which is constructed essentially in a U-shape with non-uniformly long legs and an approximately horizontal receiving plate. The illuminating device receiving system is connected with the vehicle body. The adjustment of the gap measurement between the headlight and the edge of the slide-in opening takes place by way of an adjustable screwed connection.

It is an object of the invention to provide a motor vehicle of the above-mentioned type in which the gap measurement between the headlight and the slide-in opening is optimized.

This object is achieved by way of a motor vehicle of the type mentioned above in which the fastening flanges and the fastening surfaces are situated in a plane with respect to which a vertical vehicle axis is parallel. Additional characteristics of the invention are also specified in the claims.

Principal advantages achieved by way of the invention are that, by orienting the fastening flanges and fastening surfaces according to the invention, positioning of the illuminating device receiving system relative to the slide-in opening is obtained in the direction of the vertical vehicle axis. After positioning the illuminating device receiving system on the interior side of the vehicle body skin, the two parts are unreleasably connected with one another by welding. When mounting the vehicle body skin, for example, of a fender, the position of the receiving plate of the illuminating device receiving system with respect to the slide-in opening can already be fixed in the direction of this vertical vehicle axis, and thus in the so-called Z-direction. Consequently, during later insertion of the exterior illuminating device, particularly of the headlight, into the slide-in opening, little or no adjusting work is required for adjusting the gap measurement between the headlight and the edge of the slide-in opening. The invention is particularly advantageous when the slide-in opening is constructed on a front section of the motor vehicle, for example, at least partially in the fender, and the exterior illuminating device is a headlight. It is also conceivable to arrange the slide-in opening with the illuminating device receiving system in the rearward area of the motor vehicle in order to accommodate a rear light.

According to a further feature of the invention, the receiving plate of the illuminating device receiving system extends approximately horizontally. The strip-type fastening flange extending at an angle with respect to the longitudinal axis of the vehicle permits sloping of the front section in the direction of the forward vehicle end, which is particularly helpful in a sportscar.

In a particularly preferred embodiment, the illuminating device receiving system is connected on at least three sides with the vehicle body skin part, which permits a particularly stiff construction, and the holder permits fastening of another, adjoining vehicle body skin part.

According to a further feature of the invention, the holder is oriented so as to also aid the positioning of the receiving plate with respect to the slide-in opening.

Embodiments of the invention will be explained in detail with reference to the drawings.

DETAILED DESCRIPTION OF THE INVENTION

Figure 1:
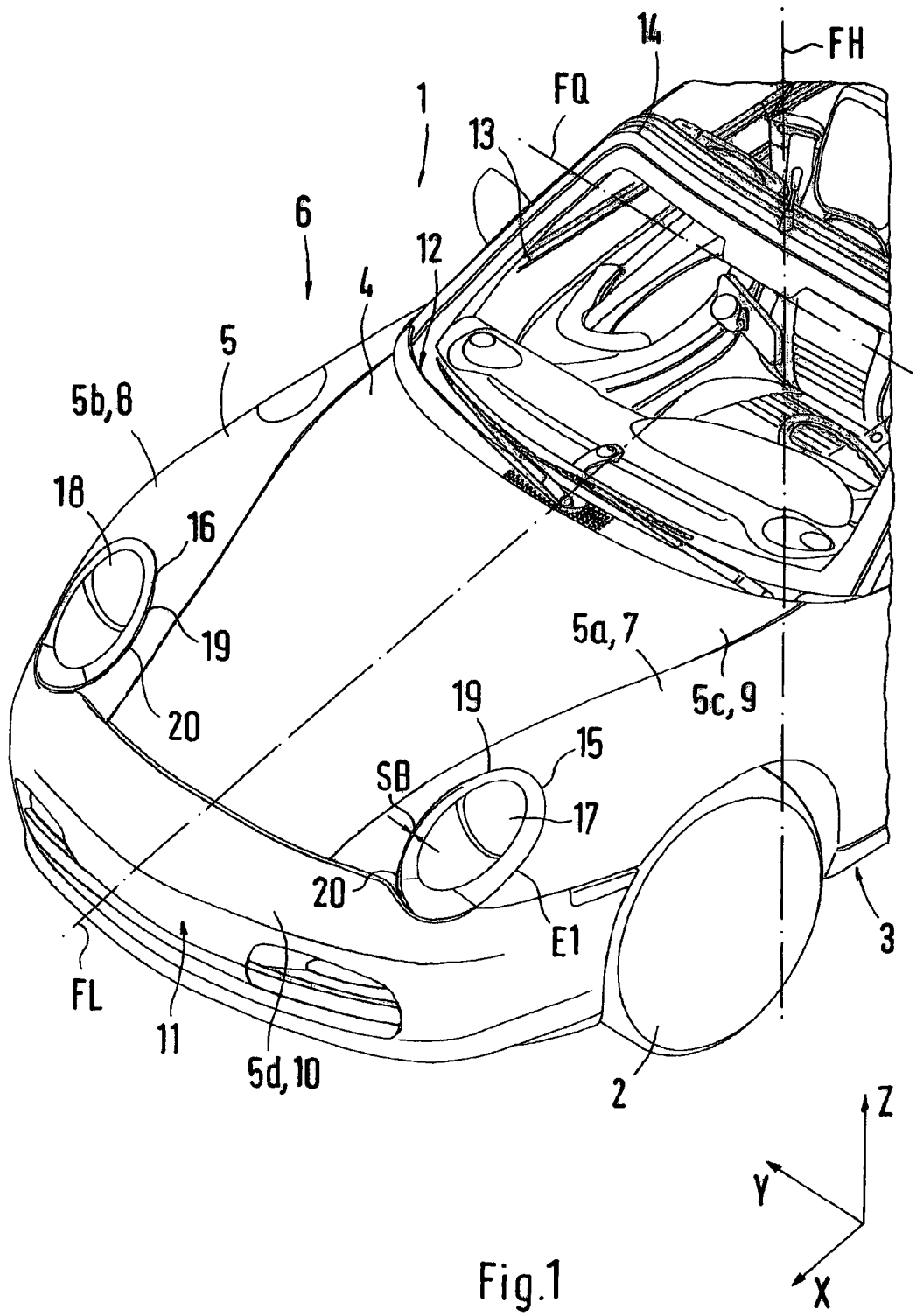
FIG. 1 is a perspective cutout-type view of a motor vehicle having a vehicle body and an exterior illuminating device.

FIG. 1 illustrates a mounting 3, which is carried by wheels 2, of a partially shown motor vehicle 1 with a vehicle body 4 having a vehicle body skin 5 of the motor vehicle 1. Of the mounting 3, a front section 6 of the motor vehicle is shown in FIG. 1. The vehicle body skin 5 in the area of the front section 6 is constructed in several parts and comprises several mutually adjoining vehicle body skin parts 5a, 5b, 5c and 5d, which are constructed particularly as fenders 7 and 8; a hood 9 situated between the fenders 7 and 8; and a front covering part 10 adjoining the hood 9 and the fenders 7 and 8. The front covering part 10 forms the forward vehicle end 11. Starting from a lower frame part 12 of an apron 14 carrying a windshield 13, the front section 6 slopes downward with its vehicle body skin 5 in the direction of the forward vehicle end 11, for example, in the manner of a wedge. One exterior illuminating device 17 and 18 respectively is inserted into the vehicle body 4 in an insertion opening 15 and 16 bounded in each case by a fender 7 and 8 respectively and the adjoining front covering part 10. These exterior illuminating devices 17 and 18 respectively close off the vehicle body skin 5, and can form continuous surfaces therewith. Here, the exterior illuminating devices 17 and 18 respectively are constructed as headlights. Between edges 19 of the respective slide-in opening 15 and 16 and the respective exterior illuminating devices 17 and 18, a surrounding gap 20 is situated which has a narrow gap width SB. As also illustrated in FIG. 1, the slide-in openings 15, 16 have approximately oval constructions and are situated at least in sections in a plane E1 which—caused by the front section 6 sloping downward in the direction of the forward vehicle end 11—extends at an angle to a plane which is not shown here and in which a longitudinal axis FL of the vehicle is situated. In addition to the longitudinal vehicle axis FL, FIG. 1 also shows the transverse vehicle axis FQ and the vertical vehicle axis FH. According to the definition, the longitudinal vehicle axis FL forms an X-axis, the transverse vehicle axis FQ forms a Y-axis and the vertical vehicle axis FH forms a Z-axis in a triaxial system of coordinates X, Y, Z.

In order to be able to fasten the exterior illuminating devices 17 and 18 respectively in the slide-in openings 15 and 16, an illuminating device receiving system 21 is arranged adjacent to and below each slide-in opening 15 and 16. The illuminating device receiving system 21 is described in detail by means of FIGS. 2 and 3. Identical parts or parts having the same effect as in FIG. 1 are provided with the same reference numbers. The illuminating device receiving system 21 is fastened to the interior side 22 of the vehicle body skin 5, here therefore on the interior side 22 of the fender 7 (vehicle body skin part 5a), preferably in an unreleasable manner, for example, by means of welding. The illuminating device receiving system 21 has an approximately horizontally extending receiving plate 23 which therefore extends parallel to the longitudinal vehicle axis FL. The exterior illuminating device 17 (FIG. 1) is supported on the receiving plate 23. Furthermore, the illuminating device receiving system 21 has a first fastening flange 24 which is constructed as a strip 25 extending in the longitudinal direction of the vehicle, and thus in the direction of the longitudinal vehicle axis FL, but encloses an angle (not shown) with the longitudinal vehicle axis FL. Furthermore, the illuminating device receiving system 21 comprises a second fastening flange 26 which is also constructed as a strip 27 extending in the longitudinal direction of the vehicle, thus in the direction of the longitudinal vehicle axis FL and approximately parallel to the longitudinal vehicle axis FL. The first and second fastening flanges 24 and 26 respectively correspond with fastening surfaces 28 and 29 provided on the interior side 22 of the vehicle skin 5. The fastening of the illuminating device receiving system 21 on the interior side 22 therefore takes place by means of the fastening flanges 24 and 26 on the assigned fastening surfaces 28 and 29. Fastening surface 28 is formed on a downward-oriented step 30 at the vehicle body skin part 5a. The step 30—starting from the level of the vehicle body skin 5—first slopes downward by way of a shoulder 31 which changes into a fastening strip 32 laterally extending away from there. By means of the fastening strip, the fender 7 or the vehicle body skin part 5a is fastened to the mounting 3 of the motor vehicle 1. The second fastening surface 29 is formed opposite the first fastening surface 28 on the fender 7 and starts out from a shoulder 33 on the fender 7. The shoulder 33 extends toward the interior away from the interior side 22. Thus, the slide-in opening 15 or 16 is situated between the fastening surfaces 28 and 29. The downward-extending fastening surface 29, to which the second fastening flange 26 is linked, moreover, is used for fastening the fender 7 to the mounting 3.

Figure 3:
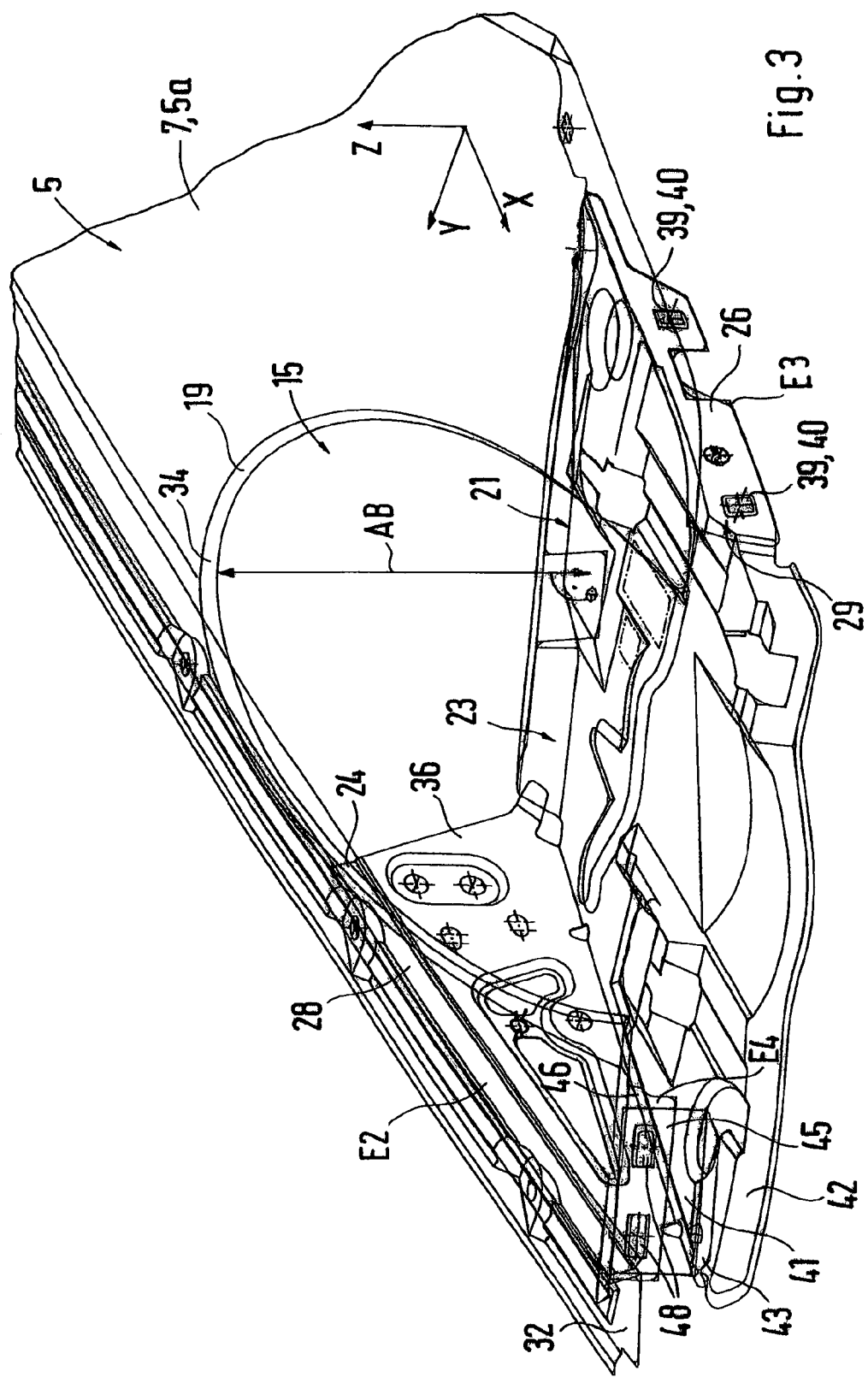
FIG. 3 is a cutout-type view of the assembled vehicle body with the illuminating device receiving system for the exterior illuminating device.

In order to be able to influence the gap width Sb of the surrounding gap 20 at least in sections, positioning of the receiving plate 23 is provided in the Z-direction, whereby a distance AB to be measured in the Z-direction can be adjusted as a vertical line between the receiving plate 23 and the so-called 12 o'clock position 34 at the edge 19 of the slide-in opening 15, as illustrated in FIG. 3. For this purpose, the first and second fastening flanges 24 and 26 as well as the pertaining first and second fastening surfaces 28 and 29 are oriented such that they are respectively situated in planes E2 and E3, or set up the latter, to which the vertical vehicle axis FH is parallel. The planes E2 and E3 respectively therefore stand upright, and extend parallel to the X-axis, or an imagined vertical line, not shown here, is situated in the planes E2 and E3 respectively. Thus, during mutual connection of the fender 7 and the illuminating device receiving system 21, the distance AB (FIG. 3) can be adjusted by positioning the illuminating device receiving system 21 in the Z-direction, so that the exterior illuminating device 17 and 18 respectively is oriented particularly in the Z-direction with respect to the edge 19 of the slide-in opening 15 corresponding to the required gap width SB. For a precision adjustment of the gap width SB, an adjusting device may also be provided between the exterior illuminating device 17 and 18 respectively and the illuminating device receiving system 21, particularly the receiving plate 23, which adjusting device is not shown here. If required, the adjusting device additionally permits adjustment of the exterior illuminating devices 17 and 18, respectively, in the Y-direction.

Figure 2:
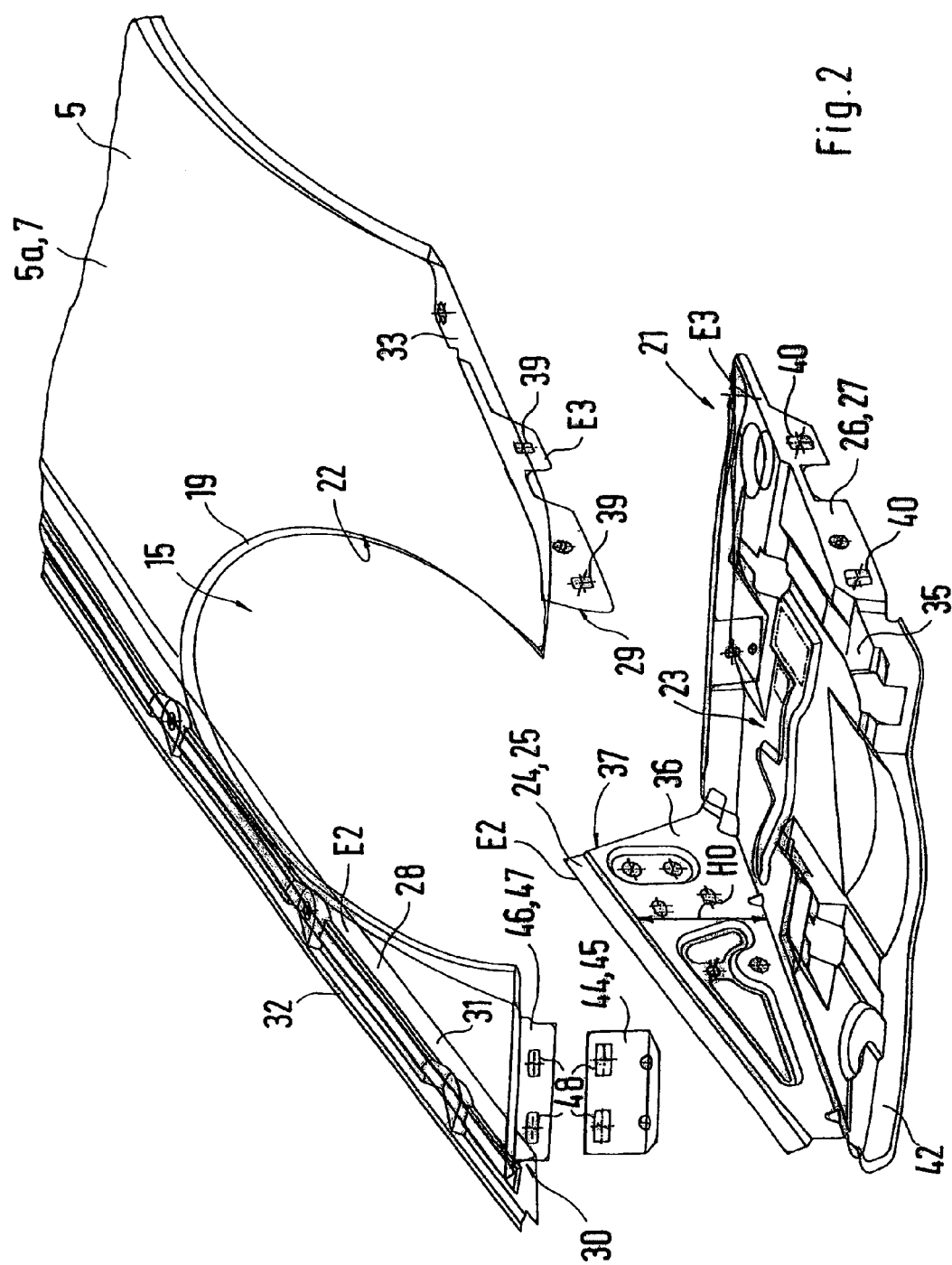
FIG. 2 is an exploded view of a cutout of the vehicle body with an illuminating device receiving system for the exterior illuminating device.

Viewed in the direction of the transverse axis FQ of the vehicle, the illuminating device receiving system 21 has an approximately L-shaped cross-section and a horizontal leg 35 as well as a vertical leg 36. The horizontal leg 35 forms the receiving plate 23, and the vertical leg 36 carries the first fastening flange 24 at its end, if required, by way of a right-angle bend 37. As illustrated in FIG. 2, the height HO of the vertical leg 36 decreases in the direction of the forward vehicle end 11. The second fastening flange 26, bent-away downward on the edge side, starts out at the end of the receiving plate 23 situated opposite the vertical leg 36. The second fastening flange 26 has openings 40 which correspond with fastening openings 39 arranged in the second fastening surface 29. Fastening devices, not shown here, reach through these openings 40 in order to be able to connect the fender 7 with the mounting 3. The illuminating device receiving system 21 is produced in one piece as a shaped sheet metal part.

As illustrated in FIGS. 2 and 3, the illuminating device receiving system 21 is additionally fastened with the interior side 22 to the fender 7 by way of a holder 41, particularly constructed as a separate part. The plate-shaped holder 41 extends approximately in the transverse direction of the vehicle, and thus parallel to the transverse vehicle axis FQ. The holder is arranged adjacent to a forward boundary edge 42 of the receiving plate 23. Viewed in the direction of the longitudinal vehicle axis FL, the holder 41 has an L-shaped cross-section and, with its horizontal section 43, is preferably unreleasably connected with the receiving plate 23. The vertical section 44 forms a third fastening flange 45 which is preferably unreleasably connected with a third fastening surface 46 constructed on the fender 7. The third fastening surface 46 is constructed as a strip 47, and the third fastening surface 46 as well as the vertical section 44 of the holder 41 set up a plane E4 or are situated in the vertical plane E4, with respect to which the vertical vehicle axis FH is parallel. However, the plane E4 is oriented such that the transverse vehicle axis FQ also extends parallel thereto, whereas the planes E2 and E3 extend parallel to the longitudinal vehicle axis FL and to the vertical vehicle axis FH.

In addition to being used for the connection between the receiving plate 23 and the fender 7, the holder 41 is also used for fastening the front covering part 10 to the vehicle body 4. For this purpose, at least one fastening opening 48, and preferably two fastening openings 48, are made in each case in the third fastening surface 46 and the third fastening flange 45. The fastening devices for the front covering part 10 reach through the fastening openings 48. The holder 41 with its horizontal section 43 is preferably connected with the receiving plate 23 by welding. Preferably, the fastening flanges 24, 26 and 45 are connected with the pertaining fastening surface 28, 29 and 46, also by welding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A motor vehicle with a vehicle body comprising:
   a vehicle body skin,
   an exterior illuminating device which is inserted into a slide-in opening in the vehicle body skin, and
   an illuminating device receiving system which is fastened adjacent to the slide-in opening on an interior side of the vehicle body skin,
   wherein the illuminating device receiving system has at least one approximately horizontally oriented receiving plate and at least first and second fastening flanges which are connected with first and second fastening surfaces on the interior side of the vehicle body skin,
   wherein the fastening flanges and the fastening surfaces are situated in a plane with respect to which a vertical vehicle axis is parallel,
   wherein, in a direction of a transverse vehicle axis, the illuminating device receiving system has an approximately L-shaped cross-section, a horizontal leg, and a vertical leg,
   wherein the vertical leg has a first of the fastening flanges, and wherein a second of the fastening flanges starts out on an edge side from the horizontal leg,
   wherein the first of the fastening flanges extends as a strip approximately in a longitudinal vehicle direction but at an angle with respect to a longitudinal vehicle axis, and
   wherein the second fastening flange is oriented as a strip approximately in the longitudinal vehicle direction and approximately parallel to the longitudinal vehicle axis.

2. A motor vehicle with a vehicle body comprising:
   a vehicle body skin,
   an exterior illuminating device which is inserted into a slide-in opening in the vehicle body skin, and
   an illuminating device receiving system which is fastened adjacent to the slide-in opening on an interior side of the vehicle body skin,
   wherein the illuminating device receiving system has at least one approximately horizontally oriented receiving plate and at least first and second fastening flanges which are connected with first and second fastening surfaces on the interior side of the vehicle body skin,
   wherein the fastening flanges and the fastening surfaces are situated in a plane with respect to which a vertical vehicle axis is parallel,
   wherein, in a direction of a transverse vehicle axis, the illuminating device receiving system has an approximately L-shaped cross-section, a horizontal leg, and a vertical leg, wherein the vertical leg has a first of the fastening flanges,
   wherein a second of the fastening flanges starts out on an edge side from the horizontal leg,
   wherein an edge of the slide-in opening is formed by two mutually adjoining vehicle body skin parts of the vehicle body,
   wherein the first and second of the fastening flanges are fastened to one of the vehicle body skin parts, wherein the illuminating device receiving system is additionally connected by way of a separate holder with the one of the vehicle body skin parts,
   wherein another of the vehicle body skin parts is fastened at least to the holder,
   wherein the vehicle body skin part fastened to the holder has a third fastening surface for the holder, and
   wherein the third fastening surface, like the first and second fastening surfaces, defines a plane with respect to which the vertical vehicle axis is parallel.

3. The motor vehicle according to claim 2, wherein the third fastening surface is constructed as a strip which extends approximately parallel to a transverse vehicle axis.

4. The motor vehicle according to claim 3, wherein, in a direction of a longitudinal vehicle axis, the holder has an L-shaped cross-section, wherein a horizontal section of the holder is connected with the receiving plate, and wherein a vertical section of the holder has a third fastening flange which is connected with the third fastening surface.

5. An illuminating device receiving system for a motor vehicle with a vehicle body having a vehicle body skin and adapted to receive an exterior illuminating device which is inserted into a slide-in opening in the vehicle body skin, the illuminating device receiving system being fastened adjacent to the slide-in opening on an interior side of the vehicle body skin and comprising:
   at least one approximately horizontally oriented receiving plate, and
   at least first and second fastening flanges which are connected with first and second fastening surfaces on the interior side of the vehicle body skin,
   wherein the fastening flanges and the fastening surfaces are situated in a plane with respect to which a vertical vehicle axis is parallel,
   wherein, in a direction of a transverse vehicle axis, the illuminating device receiving system has an approximately L-shaped cross-section, a horizontal leg, and a vertical leg,
   wherein the vertical leg has a first of the fastening flanges,
   wherein a second of the fastening flanges starts out on an edge side from the horizontal leg,
   wherein the first of the fastening flanges extends as a strip approximately in a longitudinal vehicle direction but at an angle with respect to a longitudinal vehicle axis, and
   wherein the second fastening flange is oriented as a strip approximately in the longitudinal vehicle direction and approximately parallel to the longitudinal vehicle axis.

6. An illuminating device receiving system for a motor vehicle with a vehicle body having a vehicle body skin and adapted to receive an exterior illuminating device which is inserted into a slide-in opening in the vehicle body skin, the illuminating device receiving system being fastened adjacent to the slide-in opening on an interior side of the vehicle body skin and comprising:
- at least one approximately horizontally oriented receiving plate, and
- at least first and second fastening flanges which are connected with first and second fastening surfaces on the interior side of the vehicle body skin,
- wherein the fastening flanges and the fastening surfaces are situated in a plane with respect to which a vertical vehicle axis is parallel,
- wherein, in a direction of a transverse vehicle axis, the illuminating device receiving system has an approximately L-shaped cross-section, a horizontal leg, and a vertical leg,
- wherein the vertical leg has a first of the fastening flanges,
- wherein a second of the fastening flanges starts out on an edge side from the horizontal leg,
- wherein an edge of the slide-in opening is formed by two mutually adjoining vehicle body skin parts of the vehicle body,
- wherein the first and second of the fastening flanges are fastened to one of the vehicle body skin parts,
- wherein the illuminating device receiving system is additionally connected by way of a separate holder with the one of the vehicle body skin parts,
- wherein another of the vehicle body skin parts is fastened at least to the holder,
- wherein the vehicle body skin part fastened to the holder has a third fastening surface for the holder, and
- wherein the third fastening surface, like the first and second fastening surfaces, defines a plane with respect to which the vertical vehicle axis is parallel.

7. The system according to claim 6, wherein the third fastening surface is constructed as a strip which extends approximately parallel to a transverse vehicle axis.

8. The system according to claim 7, wherein, in a direction of a longitudinal vehicle axis, the holder has an L-shaped cross-section, wherein a horizontal section of the holder is connected with the receiving plate, and wherein a vertical section of the holder has a third fastening flange which is connected with the third fastening surface.

\* \* \* \* \*